US010502062B2

(12) United States Patent
Forcier

(10) Patent No.: US 10,502,062 B2
(45) Date of Patent: Dec. 10, 2019

(54) INTEGRALLY BLADED ROTOR HAVING AXIAL ARM AND POCKET

(71) Applicant: United Technologies Corporation, Hartford, CT (US)

(72) Inventor: Matthew P. Forcier, South Windsor, CT (US)

(73) Assignee: United Technologies Corporation, Farmington, CT (US)

(*) Notice: Subject to any disclaimer, the term of this patent is extended or adjusted under 35 U.S.C. 154(b) by 921 days.

(21) Appl. No.: 14/919,073

(22) Filed: Oct. 21, 2015

(65) Prior Publication Data
US 2016/0201470 A1 Jul. 14, 2016

Related U.S. Application Data

(60) Provisional application No. 62/067,548, filed on Oct. 23, 2014.

(51) Int. Cl.
F01D 5/02 (2006.01)
F01D 5/14 (2006.01)
F02C 3/04 (2006.01)
F04D 29/32 (2006.01)
F01D 5/08 (2006.01)
(Continued)

(52) U.S. Cl.
CPC .............. F01D 5/147 (2013.01); F01D 5/02 (2013.01); F01D 5/06 (2013.01); F01D 5/063 (2013.01); F01D 5/08 (2013.01); F01D 5/3061 (2013.01); F01D 5/34 (2013.01); F01D 25/08 (2013.01); F02C 3/04 (2013.01); F04D 29/321 (2013.01); F04D 29/322 (2013.01); F04D 29/324 (2013.01); F05D 2220/36 (2013.01); F05D 2230/53 (2013.01); F05D 2240/20 (2013.01);
(Continued)

(58) Field of Classification Search
CPC ... F01D 5/02; F01D 5/06; F01D 5/063; F01D 5/34; F01D 5/08; F01D 5/147; F01D 5/3061; F01D 25/08; F05D 2230/53; F05D 2240/20; F05D 2240/24
See application file for complete search history.

(56) References Cited

U.S. PATENT DOCUMENTS 2,916,256 A * 12/1959 Welch ................ F01D 5/06
416/201 R
5,215,440 A * 6/1993 Narayana ............. F01D 5/06
416/198 A
(Continued)

FOREIGN PATENT DOCUMENTS

EP 1357295 10/2003
EP 2359975 8/2011
(Continued)

OTHER PUBLICATIONS

European Search Report for European Patent Application No. 15190587.4 completed Mar. 21, 2016.

Primary Examiner — Gerald L Sung
Assistant Examiner — Marc J Amar
(74) Attorney, Agent, or Firm — Carlson, Gaskey & Olds, P.C.

(57) ABSTRACT

An integrally bladed rotor includes a monolithic rotor body that has a bore portion, a rim, and a web that joins the bore portion and the rim. A plurality of blades extends outwardly from the rim. An arm that extends axially off of the rim, and there is a pocket on a radially inner side of the arm.

19 Claims, 2 Drawing Sheets

(51) Int. Cl.
 *F01D 5/30* (2006.01)
 *F01D 5/06* (2006.01)
 *F01D 25/08* (2006.01)
 *F01D 5/34* (2006.01)

(52) U.S. Cl.
 CPC ...... *F05D 2240/24* (2013.01); *F05D 2240/30* (2013.01)

(56) References Cited

U.S. PATENT DOCUMENTS

| | | | |
|---|---|---|---|
| 5,628,621 A * | 5/1997 | Toborg | F01D 5/066 416/198 A |
| 5,988,890 A | 11/1999 | Busbey et al. | |
| 6,454,535 B1 * | 9/2002 | Goshorn | F01D 5/022 416/193 R |
| 6,471,474 B1 * | 10/2002 | Mielke | F01D 5/02 29/889.21 |
| 7,186,079 B2 * | 3/2007 | Suciu | F01D 5/066 415/199.5 |
| 7,445,433 B2 | 11/2008 | Chivers et al. | |
| 8,636,195 B2 * | 1/2014 | Konitzer | B23K 20/1205 228/113 |
| 8,821,122 B2 * | 9/2014 | Borufka | F01D 5/082 415/115 |
| 2002/0158417 A1 * | 10/2002 | Wallace | C23C 8/06 277/414 |
| 2003/0233822 A1 * | 12/2003 | Albrecht | F01D 21/045 60/39.091 |
| 2005/0111970 A1 * | 5/2005 | Suciu | F01D 5/063 415/199.5 |
| 2006/0099070 A1 | 5/2006 | Suciu et al. | |
| 2009/0016886 A1 | 1/2009 | Pichel | |
| 2009/0304473 A1 * | 12/2009 | Holze | B23C 3/18 409/131 |
| 2010/0288648 A1 * | 11/2010 | Secherling | C25F 3/02 205/640 |
| 2011/0064580 A1 * | 3/2011 | Barnes | F01D 5/143 416/204 A |
| 2011/0076147 A1 * | 3/2011 | Ganesh | B21J 5/002 416/204 R |
| 2011/0223025 A1 | 9/2011 | Schutte et al. | |
| 2011/0255991 A1 | 10/2011 | Borufka et al. | |
| 2012/0224972 A1 * | 9/2012 | Stiehler | B23K 13/00 416/223 A |
| 2013/0004313 A1 * | 1/2013 | El-Aini | F01D 5/10 416/134 R |
| 2013/0078084 A1 * | 3/2013 | Gendrich | F01D 5/20 415/173.1 |
| 2014/0250897 A1 * | 9/2014 | Ayers | F01D 11/22 60/772 |
| 2014/0260326 A1 | 9/2014 | Schwarz et al. | |

FOREIGN PATENT DOCUMENTS

| | | |
|---|---|---|
| EP | 2365183 | 9/2011 |
| EP | 2573326 | 3/2013 |

* cited by examiner

US 10,502,062 B2

INTEGRALLY BLADED ROTOR HAVING AXIAL ARM AND POCKET

CROSS-REFERENCE TO RELATED APPLICATION

The present disclosure claims priority to U.S. Provisional Patent Application No. 62/067,548, filed Oct. 23, 2014.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Rotors in the compressor section can be assembled from a disk that has a series of slots that receive and retain respective rotor blades. Another type of rotor is an integrally bladed rotor, sometimes referred to as a blisk. In an integrally bladed rotor, the disk and blades are formed from a single piece or are welded together as a single piece. As can be appreciated, due to the fabrication, stresses, and other factors, the design of an assembled rotor and the design of an integrally bladed rotor will differ.

SUMMARY

An integrally bladed rotor according to an example of the present disclosure includes a monolithic rotor body that has a bore portion, a rim, a web joining the bore portion and the rim, a plurality of blades that extend outwardly from the rim, an arm that extends axially off of the rim, and a pocket on a radially inner side of the arm.

In a further embodiment of any of the foregoing embodiments, the pocket is formed by the arm, the rim, and the web.

In a further embodiment of any of the foregoing embodiments, the pocket has a flat side.

In a further embodiment of any of the foregoing embodiments, a pocket has a curved side.

In a further embodiment of any of the foregoing embodiments, the arm includes at least one seal.

In a further embodiment of any of the foregoing embodiments, a free end of the arm includes a radial wall.

In a further embodiment of any of the foregoing embodiments, the arm includes a frustoconical portion joining the rim and a cylindrical portion of the arm.

A gas turbine engine according to an example of the present disclosure includes a compressor section, a combustor section in communication with the compressor section, and a turbine section in communication with the combustor section. The compressor section has an integrally bladed rotor that includes a monolithic rotor body that includes a bore portion, a rim, a web joining the bore portion and the rim, a plurality of blades that extend outwardly from the rim, an arm that extends axially off of the rim, and a pocket on a radially inner side of the arm.

In a further embodiment of any of the foregoing embodiments, the pocket is formed by the arm, the rim, and the web.

In a further embodiment of any of the foregoing embodiments, the pocket has a flat side.

In a further embodiment of any of the foregoing embodiments, the pocket has a curved side.

In a further embodiment of any of the foregoing embodiments, the arm includes at least one knife edge seal.

In a further embodiment of any of the foregoing embodiments, a free end of the arm has a radial wall.

In a further embodiment of any of the foregoing embodiments, a cylindrical portion of the arm is radially outboard of the web.

In a further embodiment of any of the foregoing embodiments, the arm includes a frustoconical portion joining the rim and a cylindrical portion of the arm.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
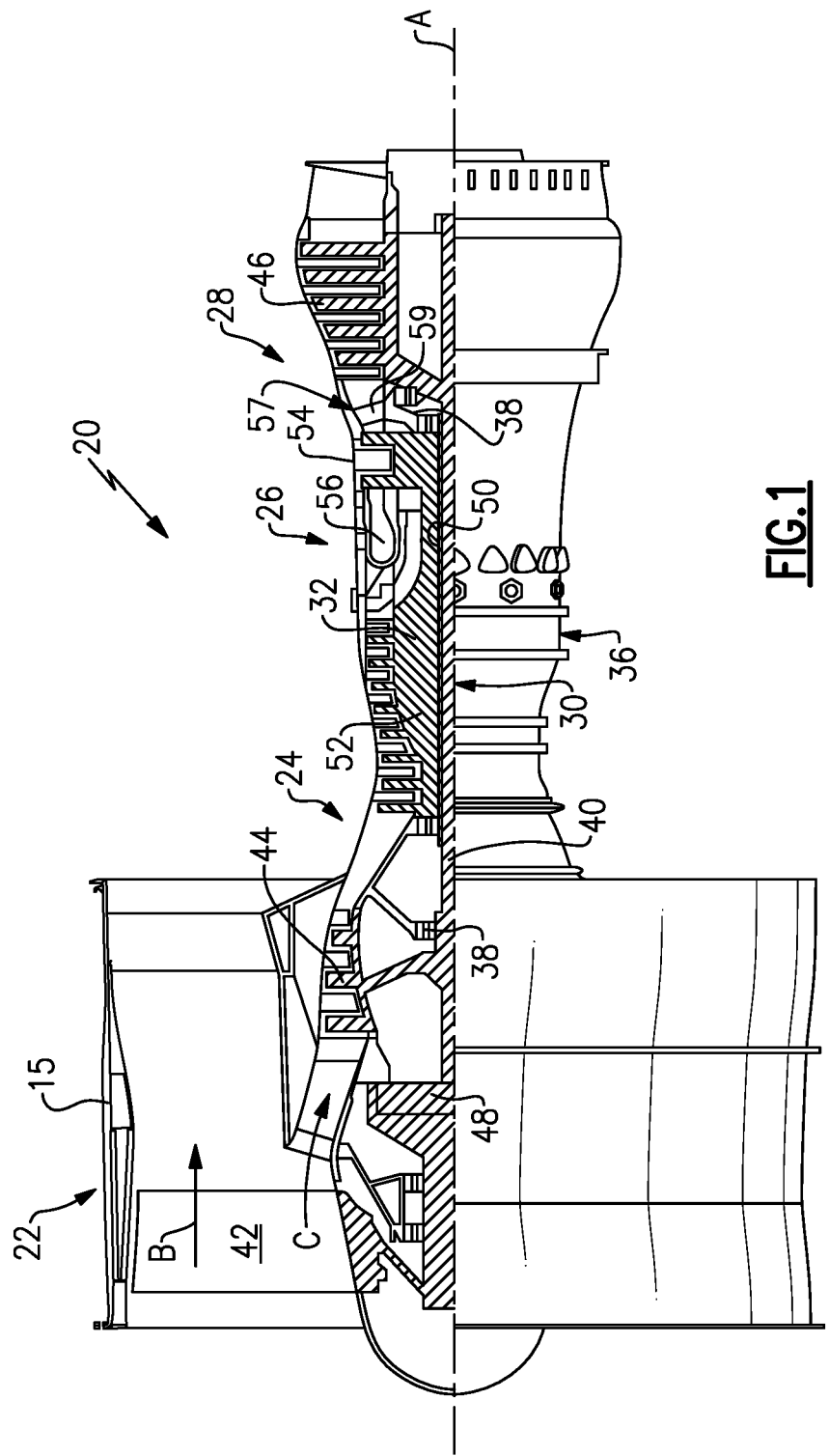
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine designs can include an augmentor section (not shown) among other systems or features.

The fan section 22 drives air along a bypass flow path B in a bypass duct defined within a nacelle 15, while the compressor section 24 drives air along a core flow path C for compression and communication into the combustor section 26 then expansion through the turbine section 28.

Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a second (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example of a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° R)/(518.7° R)]^{0.5}$. The "Low corrected fan tip speed" as disclosed herein according to one non-limiting embodiment is less than about 1150 ft/second (350.5 meters/second).

In a further example, the fan 42 includes less than about 26 fan blades. In another non-limiting embodiment, the fan 42 includes less than about 20 fan blades. Moreover, in one further embodiment the low pressure turbine 46 includes no more than about 6 turbine rotors. In a further non-limiting example the low pressure turbine 46 includes about 3 turbine rotors. A ratio between the number of blades of the fan 42 and the number of low pressure turbine rotors 46a is between about 3.3 and about 8.6. The example low pressure turbine 46 provides the driving power to rotate the fan section 22 and therefore the relationship between the number of turbine rotors in the low pressure turbine 46 and the number of blades in the fan section 22 discloses an example gas turbine engine 20 with increased power transfer efficiency.

Figure 2:
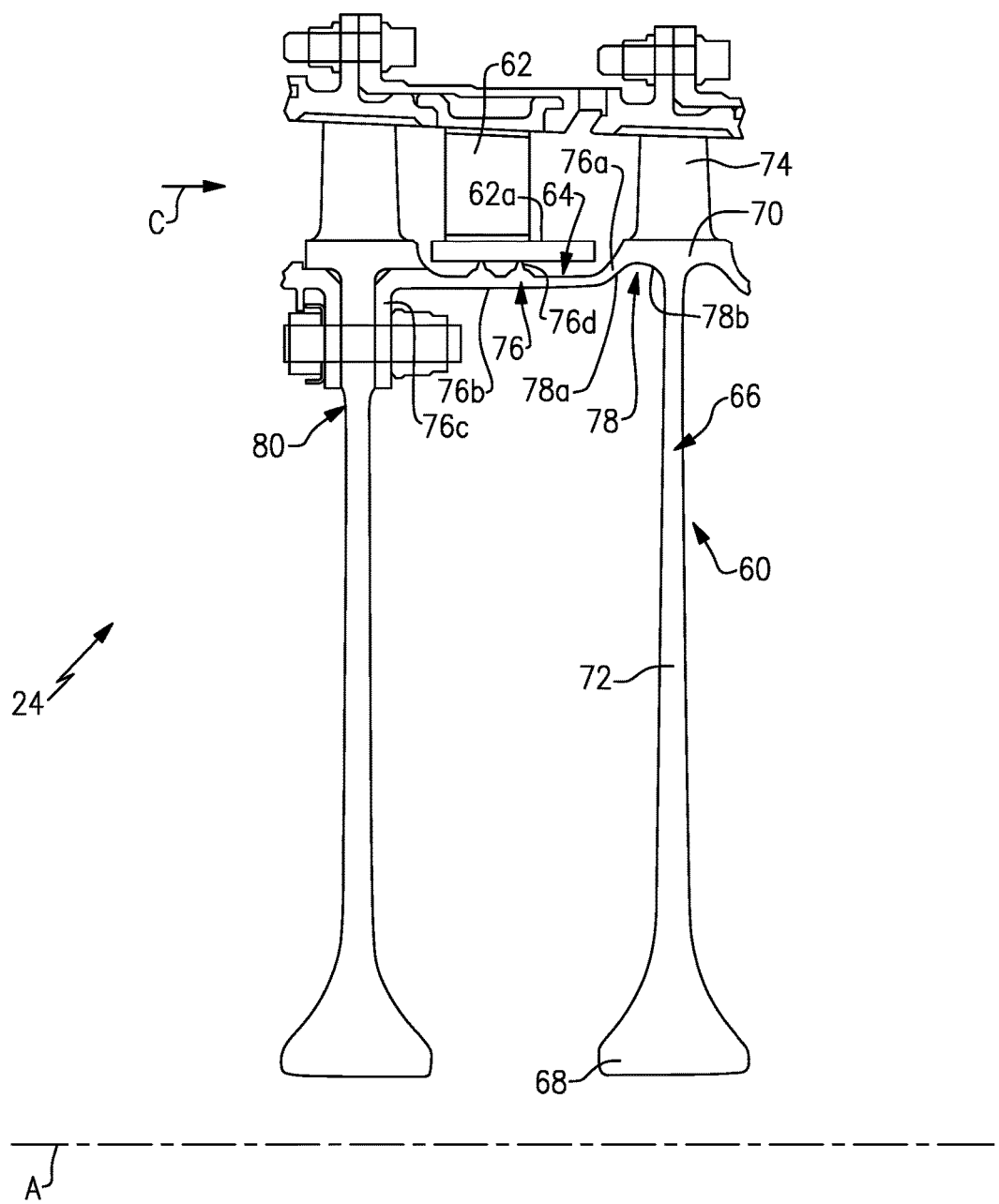
FIG. 2 illustrates selected portion of a compressor section that has an integrally bladed rotor.

FIG. 2 illustrates selected portions of the compressor section 24 of the engine 20. In this example, the compressor section 24 includes an integrally bladed rotor 60. The integrally bladed rotor 60 is formed of a single piece of material. For example, the integrally bladed rotor is a monolithic piece that is forged or machined from a solid piece.

The integrally bladed rotor 60 in this example is arranged axially downstream from a compressor vane 62 that forms a cavity 64 between the radially inner portion of the vane 62 (e.g., shroud 62a) and a portion of the integrally bladed rotor 60. As will be described in further detail, the cavity 64 in this example is relatively radially compact to reduce windage in the cavity 64 from the core gas path C.

The integrally bladed rotor 60 includes a monolithic rotor body 66 that has a bore portion 68, a rim 70, and a web 72 that joins the bore portion 68 and the rim 70. In this example, the web 72 is relatively axially thin in comparison to the bore portion 68 and rim 70. However, the web 72 could alternatively have another radially connecting structure, such as but not limited to, a relatively thicker web, spokes, or other structure that supports the rim 70 relative to the bore portion 68.

A plurality of blades 74 extend outwardly from the rim 70. An arm 76 extends generally axially off of the rim 70, with a pocket 78 on the radially inner side of the arm 76. As shown, the integrally bladed rotor 60 in this example has two such pockets 78, one on each axial side of the rotor 60. As can be appreciated, the integrally bladed rotor 60 could alternatively have only a single pocket 78 on one axial side.

In this example, the pocket 78 is formed by a portion of the arm 76, the rim 70, and the web 72. The geometry of the pocket 78 can be varied for manufacturability or other purposes, but in some examples the geometry can be selected in accordance with mechanical properties of the integrally bladed rotor 60, such as to tune the geometry to reduce vibration. In one example, the pocket 78 includes a flat side 78a and a curved side 78b. In this example, the curved side 76b has a simple curve of constant radius of curvature. In other examples, the curved side 78b can have a compound curvature, with multiple radii of curvature. Still further, the straight-line radial depth of the pocket 78 is greater than or at least equal to half of the smallest straight-line radial thickness of the arm 76.

The arm 76 includes a frustoconical portion 76a that is located between, and joins, a cylindrical portion 76b of the arm 76 and the rim 70. Alternatively, the cylindrical portion 76b could be conical or frustoconical as well. At least a portion of the cylindrical portion 76b of the arm 76 is radially outboard of the web 72. In this example, the forward, free end of the arm 76 includes a radial wall 76c that is attached to a neighboring rotor 80. The cylindrical portion 76a of the arm 76 also includes at least one knife edge seal (or other type of seal) 76d, which engages the shroud 62a of the vane 62 to facilitate sealing the cavity 64.

The extension of the arm 76 off of the rim 70 facilitates the reduction in the size of the cavity 64 such that windage throughout the cavity 64 is reduced. For instance, an arm that extends off of a web would provide a much larger cavity that is subject to greater windage. As air passes through such a cavity, windage increases the temperature of the air and the surrounding metal. However, by forming the arm 76 off of the rim 70 rather than the web 72, the size of the cavity 64 can be relatively radially compact. Further, the compactness can be achieved without having pockets inside the cavity 64, which would increase windage. Additionally, forming the arm 76 off of the rim 70 also provides an opportunity to reduce weight, by the presence of the pocket 76 rather than a solid portion in that volume. The reduction in weight can also enhance the thermal response of the integrally bladed rotor 60. The pocket 76 may also enhance any air flow inboard of the arm 76, which can facilitate thermal responsiveness of the bore portion 68.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An integrally bladed rotor comprising:
a monolithic rotor body that includes a bore portion, a rim, a web joining the bore portion and the rim, a plurality of blades that extend outwardly from the rim, an arm that extends axially off of the rim, the arm having a first portion and a second frustoconical portion, and a pocket on a radially inner side of the arm, wherein a radially most outward surface of the rim is configured to bound a fluid flowpath at one or more of the blades, and wherein a first end of the second frustoconical portion is directly connected to the first portion and a second end of the second frustoconical portion is directly connected to a forward edge of the most radially outward surface.

2. The integrally bladed rotor as recited in claim 1, wherein the pocket is formed by the arm, the rim, and the web.

3. The integrally bladed rotor as recited in claim 1, wherein the pocket has a flat side.

4. The integrally bladed rotor as recited in claim 1, where the pocket has a curved side.

5. The integrally bladed rotor as recited in claim 1, wherein the first portion is cylindrical.

6. A gas turbine engine comprising:
a compressor section;
a combustor section in communication with the compressor section; and
a turbine section in communication with the combustor section,
wherein the compressor section has an integrally bladed rotor that includes:
a monolithic rotor body that includes a bore portion, a rim, a web joining the bore portion and the rim, a plurality of blades that extend outwardly from the rim, an arm that extends axially off of the rim, the arm having a first portion and a second frustoconical portion, and a pocket on a radially inner side of the arm, wherein a radially most outward surface of the rim bounds a flowpath of fluid through the compressor section at one or more of the blades, and wherein a first end of the second frustoconical portion is directly connected to the first portion and a second end of the second frustoconical portion is directly connected to a forward edge of the most radially outward surface.

7. The gas turbine engine as recited in claim 6, wherein the pocket is formed by the arm, the rim, and the web.

8. The gas turbine engine as recited in claim 6, wherein the pocket has a flat side.

9. The gas turbine engine as recited in claim 6, wherein the pocket has a curved side.

10. The gas turbine engine as recited in claim 6, wherein the first portion is cylindrical.

11. The gas turbine engine as recited in claim 6, wherein the arm is generally parallel to a central axis of the gas turbine engine.

12. The gas turbine engine as recited in claim 11, wherein the radial wall is generally perpendicular to the central axis of the gas turbine engine and to the arm.

13. The gas turbine engine as recited in claim 6, wherein the at least one seal engages a shroud of a vane.

14. The gas turbine engine as recited in claim 6, wherein the arm includes at least one seal.

15. The gas turbine engine as recited in claim 14, wherein the at least one seal is a knife edge seal.

16. The gas turbine engine as recited in claim 6, wherein a free end of the arm includes a radial wall.

17. An integrally bladed rotor comprising:
a monolithic rotor body that includes a bore portion, a rim, a web joining the bore portion and the rim, a plurality of blades that extend outwardly from the rim, an arm that extends axially off of the rim, and a pocket on a radially inner side of the arm, wherein a radially most outward surface of the rim is configured to bound a fluid flow path at one or more blades, and wherein the arm includes a first portion and a second frustoconical portion joining the first portion to the rim, wherein the second frustoconical portion incudes a first end directly connected to the first portion of the arm and a second end directly connected to a forward edge of the most radially outward surface.

18. The integrally bladed rotor of claim 17, wherein the first portion is cylindrical.

19. The integrally bladed rotor of claim 17, wherein the first end of the first portion of the arm has a smaller radius than the second end of the first portion of the arm.

* * * * *